United States Patent [19]

Sedy

[11] 4,212,475
[45] Jul. 15, 1980

[54] SELF ALIGNING SPIRAL GROOVE FACE SEAL

[75] Inventor: Josef Sedy, Glenview, Ill.

[73] Assignee: Crane Packing Co., Morton Grove, Ill.

[21] Appl. No.: 3,251

[22] Filed: Jan. 15, 1979

[51] Int. Cl.³ .......................... F16J 15/34; F16J 15/42
[52] U.S. Cl. ...................................... 277/96.1; 277/91; 277/93 SD; 277/27
[58] Field of Search ..................... 277/81 R, 91, 93 R, 277/40, 41, 93 SD, 96, 38, 39, 96.1, 3, 27

[56] References Cited

U.S. PATENT DOCUMENTS

| | | | |
|---|---|---|---|
| 3,109,658 | 11/1963 | Barrett et al. | 277/96 X |
| 3,184,244 | 5/1965 | Van Fleet | 277/93 X |
| 3,499,653 | 3/1970 | Gardner | 277/96.1 X |
| 3,527,465 | 9/1970 | Guinard | 277/96.1 X |
| 3,704,019 | 11/1972 | McHugh | 277/96.1 X |
| 3,776,560 | 12/1973 | Wentworth | 277/93 R X |
| 3,782,737 | 1/1974 | Ludwig et al. | 277/91 X |
| 3,804,424 | 4/1974 | Gardner | 277/96.1 X |
| 3,894,741 | 7/1975 | McHugh | 277/27 |
| 4,099,729 | 7/1978 | Nylykke | 277/96.1 |
| 4,114,900 | 9/1978 | Wiese | 277/93 SD X |

*Primary Examiner*—Robert S. Ward, Jr.
*Attorney, Agent, or Firm*—Haight, Hofeldt, Davis & Jambor

[57] ABSTRACT

A self aligning, spiral groove, gas seal having a primary sealing ring and a mating sealing ring with opposed radially extending sealing faces, one of said rings having:

(a) Spiral grooves extending inwardly from the outside diameter of the face of one of said rings, said grooves having a depth of between approximately 0.0001 and 0.0003 inches, said grooves extending across the face of said ring to provide a dam width ratio of between approximately 0.5 and 0.8 according to the formula $$\text{Dam width ratio} = \frac{GD - ID}{OD - ID}$$

where GD is the diameter of a circle defined by the boundary of the grooved area and the ungrooved area in said face, ID is the internal diameter and OD is the outside diameter; and (b) Said ring has a balance of between 0.8 and 0.9 according to the formula $$\text{Balance} = \frac{OD^2 - BD^2}{OD^2 - ID^2}$$

where OD is the outside diameter of the sealing interface, ID is the internal diameter and BD is the balance diameter.

6 Claims, 6 Drawing Figures

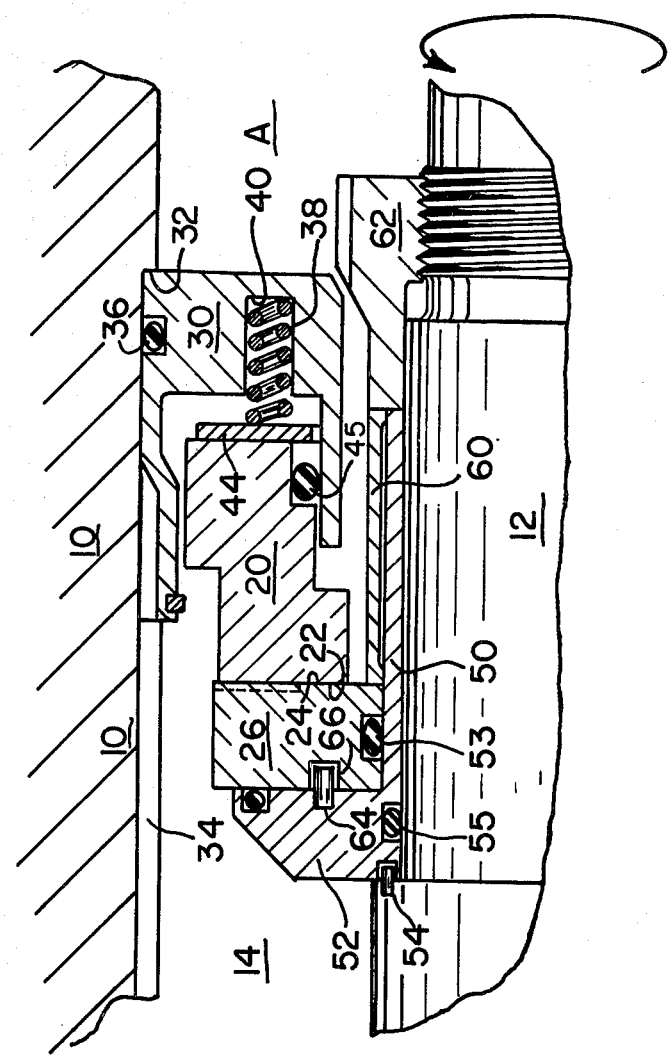
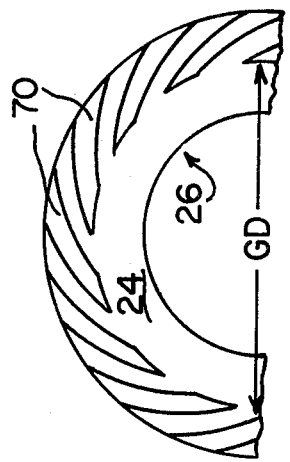
FIG-1
FIG-2

SELF ALIGNING SPIRAL GROOVE FACE SEAL

BACKGROUND OF THE INVENTION

1. Field of the Invention

This invention relates to an end face seal for sealing the space between a rotating shaft and its housing. This seal has particular benefits when used in gas turbines or compressors which have a shaft diameter in excess of three inches and which generate high pressures.

2. Description of the Prior Art

Prior to my invention, radial oil seals have been utilized in these environments. Basically these seals take the form of two or more radial sealing rings which closely surround the rotating shaft and are affixed to the housing in a sealing arrangement. Oil at a pressure in excess of the gas pressure is then pumped from a reservoir to an annular chamber defined by a gap between the sealing rings. From the annular chamber, oil then flows between rotating shaft and the sealing rings, preventing gas leakage and thereby effecting the gas sealing function. These radial oil seals, while sufficient to protect against fluid loss, have numerous design disadvantages. These include an expensive oil cooling and oil circulating systems, an oil reservoir, complexity and cost. In addition such seals have functional disadvantages including potential contamination of the gas with the associated housing and pipeline, and a large consumption of energy.

Others have recognized some of these disadvantages and sought to provide a substitute for the rotary oil seal for gas compressors. On such seal is a rotary seal depicted in U.S. Pat. No. 3,575,424 which was issued to the Koppers Company. This seal, while not using oil, is another example of a rotary or circumferential gas seal.

Another gas seal is illustrated by a type GS mechanical seal manufactured by Borg Warner Corporation. A brochure depicting this seal is attached to this patent application and is also disclosed in U.S. Pat. No. 3,628,799 which was issued to Wiese. As shown, this seal is a mechanical end face seal in which sealing is effected between opposed, relative rotating, radial faces. The patent suggests the two faces are separated by a gap which permits sufficient, but controlled, leakage to effect cooling. The patentee teaches that distortion of the stationary ring must be neutralized. To accomplish this, the patentee, through conduits, directs fluid pressure to a chamber rearward of the stationary ring and its backup ring which opposes the force of such pressure upon the forward face. By balancing the pressures in the manner stated, the patentee suggests that distortions are avoided and that the leakage gap is maintained constant.

Another gas seal is depicted in U.S. Pat. No. 3,804,424 issued to James F. Gardner. The seal disclosed in this patent is also a mechanical end face seal which operates with a gap between the opposed radial sealing faces of the sealing rings to permit controlled leakage. These rings have flat, radially extending surfaces which sealingly engage one another. The surface of one of the rings is provided with a plurality of spiral grooves which extend inwardly towards a flat dam section. Under static conditions, the dam, in conjunction with the other radial face, seals the housing. Upon rotation, pressure generated by the grooves force the faces to move axially apart to define a gap which permits controlled leakage for lubrication and cooling. Gardner, like Wiese, recognized that the distortion of the sealing rings should be avoided. To this end, Gardner sought to neutralize distortion by applying pressure to one of the sealing washers.

The present invention is similar to Gardner in that it is directed to spiral groove non-contacting face seals. The general design parameters for such seals are described in the following publications:

Ralph P. Gabriel, "Fundamentals of Sprial Groove Non Contacting Face Seals", ASLE Trans, Preprint No. 78-AM-3D-1.

Joseph Sedy, "Improved Performance of Film-Riding Gas Seals Through Enhancement of Hydrodynamic Effects", ASLE Trans, Preprint No. 78-LC-3B-1.

These articles are attached to this application for a patent and their subject matter is incorporated by reference herein.

To applicant's knowledge, end face seals have not been acceptable in gas turbines and compressors operating at high speed and pressure and having large diameters. Applicant believes such failure to arise, in part, from the inability to maintain sufficiently parallel alignment of the non-contacting faces.

Accordingly, a principle object of my invention is to provide a stable end face seal which is particularly appropriate for use in turbines and compressors having large diameter shafts and which generate high pressures. Other objectives of my invention is to provide an end face seal of the gap type which miminizes fluctuations in leakage; maintains the sealing faces in a sufficiently parallel relationship to one another, and provides a clockwise or counterclockwise couple to one washer to oppose undesired twist or deformation of that washer.

SUMMARY OF THE INVENTION

The present invention is directed to a mechanical end face seal in which one of the radially extending faces is provided with spiral grooves which, through pumping action, separate the faces to define a gap for controlled leakage. My invention is an improved design which improves parallelity of the faces and applies a force couple to the seal ring to compensate for possible clockwise or counterclockwise twist of that ring and to effect self alignment by virtue of generating interfacial pressures in excess of pressures sealed. The invention includes a seal having the following parameters:

1. dam width ratio between approximately 0.5 and 0.8;
2. a balance of between approximately 0.8 and 0.9; and
3. a groove depth of between approximately 0.0001 and 0.0003.

BRIEF DESCRIPTION OF THE DRAWINGS

The manner in which these and other objects are attained is disclosed in the following specifications and drawings in which FIG. 1 is a side elevation view in section taken along a vertical center line of a portion of a preferred embodiment of my invention.

FIG. 2 is an end view of one of the sealing rings of the preferred embodiment of my invention.

DETAILED DESCRIPTION OF THE PREFERRED EMBODIMENT

Figure 3:
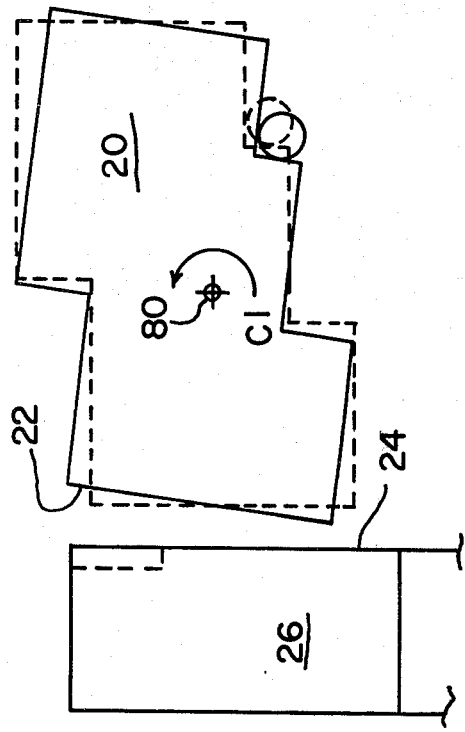
FIG. 3 is a schematic side elevation view of the primary ring of my invention depicting its possible clockwise distortion.

The preferred embodiment of my invention and its environment is depicted in FIG. 1. This environment includes the housing 10 of a compressor (not shown) and a rotating shaft 12 extending through the housing. My invention is used to seal high pressure within the space 14 against leakage to the atmosphere A.

The basic components of my invention include an annular primary sealing ring 20 having a radially extending face 22 in sealing relation with the radially extending face 24 of an annular mating ring 26.

The primary ring is held in place by an annular retainer 30 which preferably takes the shape depicted. One end of the retainer abuts a reduced diameter or shoulder 32 of the housing while a fixed sleeve 34 abuts the other end to lock the unit against axial movement. An O-ring seal 36 extends around the circumference of retainer 30 to preclude leakage between the housing 10 and the retainer 30. Between the retainer 30 and the primary ring 20 are a plurality of springs 38 seated within bores 40 spaced equidistantly about the circumference of retainer 30. These springs, acting against an annular disc 44 urge the primary ring 20 into engagement with mating ring 26. An O-ring 45 seals the space between the primary ring 20 and its retainer.

The mating ring 26 is retained in axial position by two sleeves. The sleeve 50 is coaxial with shaft 12 and is provided with a radially extending flange 52 which abuts a shoulder 54 on shaft 12 and which retains mating ring 26 against axial movement in one direction. Another sleeve 60 abuts the inner circumference of the other side of mating ring 26. The sleeves 50 and 60 and ring 26 are then locked in place by a retaining nut 62 which is threaded on shaft 12 as shown. O-rings 53 and 55 preclude loss of fluid from between the mating ring shaft and the sleeves.

As shown, the primary ring 20 is locked against rotational movement. The mating ring 26 is constrained for rotation with shaft 12 by a plurality of pins 64 which are embedded into flange 52 of sleeve 50 and extend into recesses 66 of the mating ring. Pins 54 lock the sleeve 50 to the shaft 12.

In operation, the mating ring 26 rotates with the shaft with its radial face 24 being in sealing relation to the radial face 22 of primary ring 20. Friction between these faces upon relative rotation produces heat. To avoid undue heat generation, the seal of my invention operates as a gap type seal, e.g. with a very narrow gap or space between the radial faces 22 and 24 to permit leakage or flow from the space 14 to the atmosphere. As well known in the art, this gap is obtained by forming spiral grooves 70 in the face of either the primary or mating ring. Upon rotation, these grooves act as a pump to force fluid between the seal faces. Such fluid separates the faces to permit the desired leakage. The general design considerations for a spiral groove gap type seal is well known and is discussed in the references previously identified.

My invention relates to the structure for maintaining stabliity of the primary and the mating ring and to the parallel alignment of their faces. In the absence of stability and parallelity, the rings may distort clockwise or counterclockwise due to excessive heat generation or heat removal resulting in contact between faces with subsequent face damage or seal destruction.

Seal stability is in part related to the stiffness of the fluid film between the faces. In the case of the spiral groove seal, the stiffness and, therefore, stability increase with decreasing fluid film thickness. It is, therefore, desirable to make film thickness as small as possible and this could be done simply by increasing the seal balance if it wasn't for pressure and temperature deflections which distort the faces and increase the danger of face contact, face damage, and possible seal destruction. With the aid of my invention, these pressure and temperature deflections are miminized by a self-aligning mechanism and the seal can run at narrower operating gaps (narrower film thickness) with increased stability. I have discovered that this self-aligning feature can be obtained if pressure between the sealing faces at the inner end of the grooves exceeds the sealed pressure.

In the preferred embodiment of my invention, this self-aligning feature is obtained by the dimensioning of three seal parameters with specified ranges. These parameters are (1) depth of the grooves; (2) seal balance; and (3) dam width. The groove depth should be greater than approximately 0.0001 and less than approximately 0.0003 inches. The seal balance should be between approximately 0.8 and 0.9. This term balance refers to the dimensions of the primary ring, which for a seal as shown is determined in accord with the formula $$\text{Balance} = \frac{OD^2 - BD^2}{OD^2 - ID^2}$$

where OD is the outside diameter of sealing interface, ID is the inside diameter and BD is the balance diameter. As used here, interface refers to the area of the faces which are adjacent one another.

If the primary seal ring is exposed to pressure on its internal circumference rather than its external circumference the balance is determined according to the formula $$\text{Balance} = \frac{BD^2 - ID^2}{OD^2 - ID^2}$$

The final parameter relates to the dam width ratio. According to my invention, the seal face should have a dam width ratio of between approximately 0.5 and 0.8 computed in accord with one of the following formulas $$\text{Dam Width Ratio} = \frac{GD - ID}{OD - ID} \quad (1)$$

$$\text{Dam Width Ratio} = \frac{OD - GD}{OD - ID} \quad (2)$$

where GD is the diameter of a circle defined by the boundary of the grooved area and the smooth area of the sealing face; ID is the internal diameter and OD is the external diameter. The first formula is used where the spiral grooves extend from the outside circumference of the seal face while the second formula is used where the spiral grooves extend from the inside circumference of the seal face.

When a spiral groove seal is made in accord with these three parameters, not only will the gap and leakage be small, but the previously unknown and unrecognized condition can be obtained. The pressure at the groove diameter will be greater than the pressure of the gas in space 14 to be sealed. This condition permits self alignment of the seal faces 22 and 24 to maintain them in sufficient parallel alignment and with a constant gap.

Figure 5:
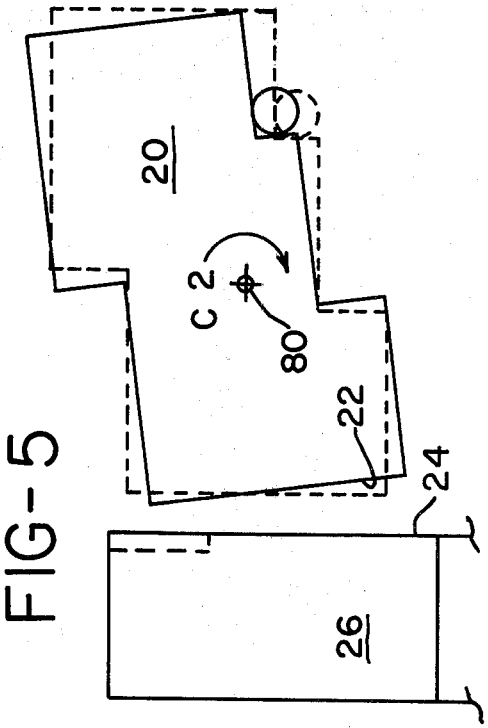
FIG. 5 is a schematic side elevation view of the primary ring of my invention depicting its possible counterclockwise distortion.
Figure 4:
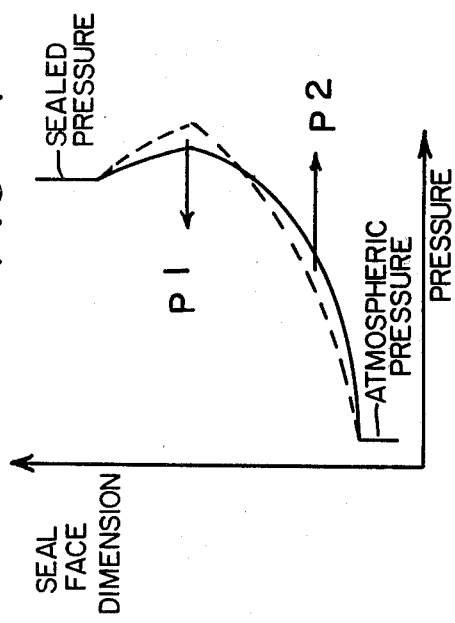
FIGS. 4 and 6 are pressure distribution curves of the hydrodynamic pressure between the seal faces of my invention depicting the pressure induced couples which self align the face of the primary sealing ring of my invention.
Figure 6:
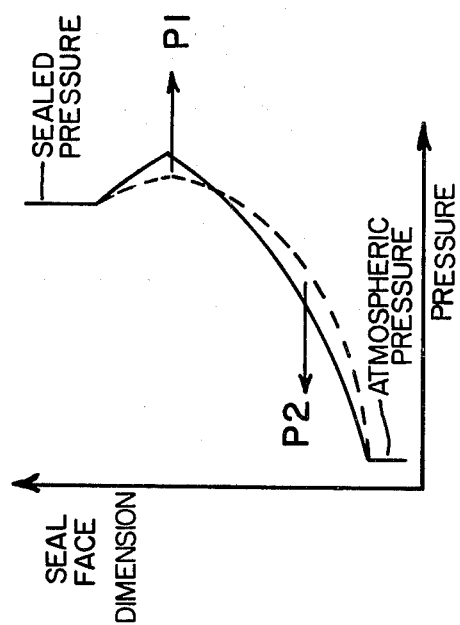

Under normal operating conditions the primary ring 26 takes the dotted line position shown in FIGS. 3 and 5. Face 22 is parallel to face 24. This position, during operation of the seal, generates a pressure distribution curve across the seal faces as shown by the dotted lines of FIGS. 4 and 6.

Now assume that, due to thermal distortion or other factors, the faces converge inwardly as shown by the full line of FIG. 3. Due to the design parameters of my invention, this convergence results in the pressure distribution curve shown by the full line of FIG. 4, and this new pressure distribution results in a counterclockwise force couple (C-1) about the centroid 80 of the primary ring, with summed pressure forces P1 and P2 acting to restore the primary ring 20 towards its aligned, parallel position.

A similar effect occurs if the faces diverge inwardly. But here, the pressure distribution curve is different and sets up a couple in the opposite direction.

Accordingly, by appropriate design of the three parameters, groove depth, dam width ratio and balance, the spiral groove seal will maintain a generally constant gap with the faces approximately parallel. In the preferred embodiment, the mating ring 26 is formed of tungsten carbide so as to minimize distortion, while the primary ring is formed of carbon—a material which runs well against the tungsten carbide and whose Young's modulus of elasticity is sufficiently low to permit alignment by the couples generated by the pressure distribution. Those skilled in the art will also appreciate that the stationary ring 20 may be formed of tungsten carbide. Other changes, such as placing the spiral groove on the stationary ring are within the scope of my invention.

I claim:

1. In a self aligning spiral groove gas seal having a stationary sealing ring and a primary sealing ring with opposed radially extending faces, one of said rings being sealingly affixed to a housing and the other affixed to the shaft, the improvement comprising:
    spiral grooves extending inwardly from one circumference of the face of one of said rings, said grooves having a depth of between approximately 0.0001 and 0.0003 inches, said grooves extending across the face of said ring to provide a dam width ratio of between approximately 0.5 and 0.8 according to one of the following formula $$\text{Dam Width Ratio} = \frac{GD - ID}{OD - ID}$$

$$\text{Dam Width Ratio} = \frac{OD - GD}{OD - ID}$$

where groove diameter is the diameter of a circle defined by the boundary of the grooved area and the ungrooved area in said face, ID is the internal diameter and OD is the outside diameter; and
    said seal having a balance of between 0.8 and 0.9 according to the formula $$\text{Balance} = \frac{OD^2 - BD^2}{OD^2 - ID^2}$$

where OD is the outside diameter of the sealing interface, ID is the inside diameter and BD is the balance diameter.

2. A seal as recited in claim 1 in which the spiral grooves extend from the outside circumference of said face towards the center of said face.

3. A seal as recited in claim 1 in which the spiral grooves extend from the inside circumference of said face towards the center of said face.

4. In a self aligning spiral groove gas seal having a stationary sealing ring and a primary sealing ring with opposed radially extending faces, one of said rings being sealingly affixed to a housing and the other affixed to the shaft, the improvement comprising:
    spiral grooves extending inwardly from one circumference of the face of one of said rings, said grooves having a depth of between approximately 0.0001 and 0.0003 inches, said grooves extending across the face of said ring to provide a dam width ratio of between approximately 0.5 and 0.8 according to one of the following formulas $$\text{Dam Width Ratio} = \frac{GD - ID}{OD - ID}$$

$$\text{Dam Width Ratio} = \frac{OD - GD}{OD - ID}$$

where groove diameter is the diameter of a circle defined by the boundary of the grooved area and the ungrooved area in said face, ID is the internal diameter and OD is the outside diameter; and
    said ring has a balance of between 0.8 and 0.9 according to the formula $$\text{Balance} = \frac{BD^2 - ID^2}{OD^2 - ID^2}$$

where OD is the outside diameter of the sealing interface, ID is the inside diameter and BD is the balance diameter.

5. A seal as recited in claim 4 in which the spiral grooves extend from the inner circumference of the face of said ring toward the center of said face.

6. A seal as recited in claim 4 in which the spiral grooves extend from the outer circumference of the face of said ring toward the center of said face.

* * * * *